United States Patent
Egedal

(10) Patent No.: US 8,206,105 B2
(45) Date of Patent: Jun. 26, 2012

(54) METHOD AND DEVICE FOR CONTROLLING LOAD REDUCTION FOR A WIND TURBINE ROTOR

(75) Inventor: Per Egedal, Herning (DK)

(73) Assignee: Siemens Aktiengesellschaft, Munich (DE)

( * ) Notice: Subject to any disclaimer, the term of this patent is extended or adjusted under 35 U.S.C. 154(b) by 1027 days.

(21) Appl. No.: 12/156,110

(22) Filed: May 29, 2008

(65) Prior Publication Data

US 2008/0298963 A1   Dec. 4, 2008

(30) Foreign Application Priority Data

Jun. 4, 2007   (EP) .................................... 07010987

(51) Int. Cl.
*B64C 27/00*   (2006.01)

(52) U.S. Cl. ............................................. 416/1; 416/61

(58) Field of Classification Search ............... 416/1, 61, 416/146 R, 500; 700/28, 41, 42, 43, 67, 700/69, 72, 282, 287, 290
See application file for complete search history.

(56) References Cited

U.S. PATENT DOCUMENTS

| | | | |
|---|---|---|---|
| 4,297,076 A | 10/1981 | Donham et al. | |
| 4,298,313 A | 11/1981 | Hohenemser | |
| 2006/0145483 A1 | 7/2006 | Larsen et al. | |
| 2007/0041837 A1* | 2/2007 | Ide et al. ................. | 416/147 |

FOREIGN PATENT DOCUMENTS

| | | |
|---|---|---|
| EP | 1666723 A1 | 6/2006 |
| EP | 1719910 A1 | 11/2006 |
| GB | 2117934 A | 10/1983 |
| WO | WO 2007104306 A1 | 9/2007 |

OTHER PUBLICATIONS

Bossanyi E.A.: "Individual Blade Pitch Control for Load Reduction", Wind Energy, Wiley, Chichester, GB; Oct. 2002, pp. 119-128; vol. 6,XP008031928ISSN: 2002, pp. 1099-1824.
Caselitz P. et al: "Reduction of Fatigue Loads on Wind Energy Converters by Advanced Control Methods"; European Wind Energy Conference, XX, Oct. 1997; p. 555-558; XP008031751; Others; 1997; IE.

* cited by examiner

*Primary Examiner* — Edward Look
*Assistant Examiner* — Adam Benson

(57) ABSTRACT

A method for controlling load reduction for a wind turbine rotor with rotor blades comprising an aerodynamic active element responsive to a control signal for modifying its setting is provided. The loads acting on the rotor blades in relation to the rotor's azimuth are detected and individual control signals based on a PI control system are established. Each individual control signal is a complex number containing an amplitude defining the degree of modification of the respective setting and an angle defining the phase of the modification of the respective setting with respect to the rotor's azimuth. The angle of the complex number is corrected by a phase correction factor. The elements are provided with the individual control signals. The input to the PI-control system is a complex load vector.

11 Claims, 2 Drawing Sheets

METHOD AND DEVICE FOR CONTROLLING LOAD REDUCTION FOR A WIND TURBINE ROTOR

CROSS REFERENCE TO RELATED APPLICATIONS

This application claims priority of European Patent Office application No. 07010987.1 EP filed Jun. 4, 2007, which is incorporated by reference herein in its entirety.

FIELD OF INVENTION

The present invention relates to a method for controlling load reduction for a wind turbine rotor and a control device for performing the method.

BACKGROUND OF INVENTION

Blades of wind turbine rotors are exposed to large dynamic loads when the wind turbine is operated in turbulent wind conditions or in conditions of flow distortion, e.g. high wind shear. Until now, therefore, the blades of wind turbine rotors and the supporting structures have been dimensioned such as to be able to withstand the dynamic loads that can occur under the conditions to which the turbine is certified. In recent years it has become clear that continuing this practice of simply having sufficient structural strength for whatever loads could occur would lead to very heavy designs for large wind turbines. Consequently, various methods have been developed for the active reduction of operational loads.

One method for actively reducing the operational loads is the so-called cyclic blade pitch. In the cyclic blade pitch the pitch setting of each rotor blade is changed during each revolution, as, e.g., described in U.S. Pat. No. 4,298,313. More recently, active flap regulation has been described where aerodynamic properties of the blade profiles are changed instead of the blade pitch.

Irrespective of the chosen actuation method, any active load reduction system needs to be controlled by a regulator. A regulator for regulating the pitch angle of rotor blades is, e.g., described in EP 1 666 723 A1. A control method and a control device for controlling the pitch angles of rotor blades of a wind turbine rotor or the aerodynamic profiles of the rotor blades based on a proportional-integral control strategy (PI-control) are described in U.S. 2006/0145483 A1.

U.S. Pat. No. 4,297,076 describes a wind turbine with tip portions of the blades which are variable in pitch and device for controlling the pitch so as to relieve bending moments on the blades. The control device comprises the unit which allows for correcting the phase angle of the control signal with respect to the rotors azimuth.

EP 1 719 910 A1 describes an active vibration damping method for a wind turbine generator and device for performing the method. A damping signal component in a blade pitch angle reference signal is provide by filtering the blade pitch angle reference signal with a transfer function which includes a time constant for approximating the lag of the pitch change mechanism in responding to that blade pitch angle reference signal. A similar approach is disclosed in GB 2 117 934 A.

Bossanyi, E. A.: Individual Blade Pitch Control for Load Reduction, Wind Energy, Wiley, Chichester, GB Volume 6 (2002-10-08) pages 119 to 128 describe the possibility of using different pitch angles demands sent to each blade as a way of reducing loads. A LQG controller (linear, quadratic, gaussian controller) is used for deriving the control signals.

Caselitz P. et al.: "Reduction of Fatigue Loads on Wind Energy Converters by Advanced Control Methods", European Wind Energy Conference, XX, XX, October 1997, pages 555 to 558 describe tilt and yaw moment compensation by individual blade control.

SUMMARY OF INVENTION

However, the regulation of an active load reduction system is not an easy task since one needs to be fast to regulate properly, in particular if fast load fluctuations are involved. No truly convincing method for such a fast regulation has so far been disclosed. The traditional regulation methods using proportional-integral-differential regulation schemes in various configurations do not have the predictive ability that is necessary for performing said fast regulation. Moreover, response times of PID regulation schemes are too long. Better results have been reached with the application of various types of learning algorithms. However, such learning algorithms tend to lead to "black box" systems that are not easily modelled and where the designer has difficulty in assessing proper function under all conditions.

It is therefore an objective of the present invention to provide an improved control method and an improved control device for controlling load reduction for a wind turbine rotor.

This objective is solved by a control method and a control device as claimed in the independent claims. The depending claims contain further developments of the invention.

The inventive control method is used to control load reduction for a wind turbine rotor with rotor blades comprising at least one aerodynamic active element responsive to a control signal for modifying its setting. In this regard, an aerodynamic active element should be understood in a broad sense as any element which is able to actively change the aerodynamic properties of a rotor blade, such as a flap, a device for setting the pitch angle of a rotor blade or a device which allows the modification of the aerodynamic profile of the blade's airfoil. The method comprises the steps of detecting the loads acting on the rotor blades in relation to the rotor's azimuth, i.e. a radial direction as measured from the rotor hub which is fixed in space. This radial direction may, e.g., extend vertically upwards from the rotor hub. Individual control signals for modifying the settings of the aerodynamic active elements of the rotor blades are established based on a PI-control system and the individual control signals are provided to the aerodynamic active elements. Each individual control signal is a complex number containing an amplitude defining the degree of modification of the respective setting and an angle defining the phase of the modification of the respective setting with respect to the rotor's azimuth. This complex number is corrected by a phase angle correction factor. The input to the PI-control system is a complex load vector. The number of complex load vector components corresponds to the number of rotor blades, i.e. the complex load vector would have three complex vector components for a three bladed rotor. However, it should be mentioned that the inventive control method is suitable for rotors with any number of rotor blades even if there is only one rotor blade present. If a vector component is given in polar representation the amplitude of a vector component of the load vector defines the magnitude of the load acting on the respective blade and the angle of this vector component defines the phase of the load with respect to the rotor's azimuth. To correct the angle of the complex number representing an individual control signal the load vector is multiplied with the phase correction factor before it is input into the PI-control system.

The invention is based on the following consideration:

Delays in the sensors and the setting systems of the aerodynamic active devices or elements have great impact on the resulting regulation response. By using a phase correction factor for correcting the complex number representing a control signal such delays can be adapted and taken into account so that the angle defining the phase of the modification with respect to the rotor's azimuth can be optimised. Compared to traditional PID-regulation methods the inventive method provides a fast response to detected load fluctuations since the delays in the sensor and the setting systems are taken into account by the phase correction factor. Compared to the learning algorithms the inventive control method does not tend to lead to "black box" systems with the mentioned difficulties.

The load fluctuations can be measured by any suitable sensor means, e.g. accelerometers or strain gauges.

As already mentioned, the phase angle between the complex number representing the individual control signal and the responding load acting on the respective rotor blade depends on factors such as delays in the actuation system for actuating the aerodynamic active elements, e.g. phase impacts from closed loop responses of servo controllers. Such delays would introduce artificial time dependencies in the arguments of the load vector's complex components. When integrating the load vector this time dependency would lead to an artificial rotation of the components in the complex plane. As a consequence, the angle of the complex number in an individual control signal would be inaccurate. However, by multiplying the load vector by the phase correction factor before it is input to the PI-control system this rotation can be counteracted so that the control signal contains the correct angle in its complex number.

The phase correction factor can be written as at least one complex number with unity absolute value and an argument defining a phase correction if the complex number is represented in polar representation. In particular, the phase correction factor may comprise a complex number with unity absolute value and an argument defining a phase correction for each vector component of the load vector. In this case the phase factor could be represented as a diagonal matrix which is to be multiplied with the load vector. If, on the other hand, the phase correction factor only contains a single complex number with unity absolute value and an argument defining a phase correction which is common to all vector components of the load vector multiplying the load vector by the phase correction factor would result in multiplying the load vector by a scalar factor.

The phase correction factor may be derived from arguments of the complex vector components of the load vector. In particular, the phase correction factor may be derived by differentiation of the arguments of the complex vector components with respect to time, subsequent integration of the arguments of the complex vector components over a definite interval and forming complex numbers with unity absolute value and the results of the integration multiplied by the imaginary unit as the arguments.

An inventive control device for controlling load reduction for a wind turbine rotor with rotor blades comprising at least one aerodynamic active element responsive to a control signal for modifying its setting comprises a load data input, a rotor azimuth input, an oscillation detecting unit, a correction factor calculator unit, a multiplier and a PI-controller. Through the load data input the control device can receive load data representing the load acting on a rotor blade. The load data may be provided by any sensor means suitable for measuring the load acting on a rotor blade, e.g. an accelerometer or a strain gauge. Through the rotor azimuth input rotor azimuth data provided by an azimuth detector can be input to the control device. The oscillation detecting unit is connected to the load data input and to the rotor azimuth input for receiving the load data and the rotor azimuth data. It is designed to detect frequency components of the load acting on a rotor blade from the load data and rotor azimuth data. In addition, it is designed to output a complex load vector, the number of complex vector components of which corresponds to the number of rotor blades. In polar representation the amplitude of a complex vector component defines the magnitude of the load acting on the respective blade and the angle of the vector component in the complex plane defines the phase of the load with respect to the rotor's azimuth. The correction factor calculator unit is connected to the oscillation detecting unit for receiving the load vector. It is designed to calculate and to output a phase correction factor on the basis of the load vector. The multiplier is also connected to the oscillation detecting unit for receiving the load vector. In addition, it is connected to the correction factor calculator unit for receiving the phase correction factor. It is designed to multiply the load vector by the phase correction factor. The PI-controller is connected to the multiplier for receiving the multiplication result. It is designed to establish and to output individual control signals for modifying the settings of the aerodynamic active elements of the rotor blades. The inventive control device is especially adapted for performing the inventive control method. Therefore, it provides the properties and advantages which have already been described with respect to the control method.

In a special implementation of the inventive control device the correction factor calculator unit comprises an argument determination unit, a differentiator, an integrator and a complex factor building unit. In this implementation, the argument determination unit is connected to the oscillation detecting unit to receive the load vector and designed to determine the arguments of the load vector's complex components and to output the arguments. The differentiator is connected to the argument determination unit for receiving the arguments. It is designed to determine the time derivative of the arguments and to output the time derivative. The integrator is connected to the differentiator for receiving the time derivatives of the arguments. It is designed to integrate the time derivatives of the arguments over a definite interval and to output the integration values. Finally, the complex factor building unit is connected to the integrator for receiving the integration values. It is designed to form the phase correction factor by a multiplication of the integration values by the imaginary unit and a subsequent exponentiation. By differentiating the argument non-time dependent terms of the argument can be removed from the argument. Then, by calculating a definite integral, a constant argument can be derived which represents the phase error from the artificial time dependency in the argument summarised over the integration period. Then, by multiplying the integration result with the imaginary unit i and building the term exp(ia), where a represents the integration result, a suitable phase correction factor taking into account the delays in the sensor and the actuation system is provided.

BRIEF DESCRIPTION OF THE DRAWINGS

Further features, properties and advantages of the present invention will become clear from the following description of an embodiment of the invention in conjunction with the accompanying drawings.

DETAILED DESCRIPTION OF INVENTION

The inventive control method and the inventive control device will now be described with reference to FIGS. 1 and 2.

Figure 1:
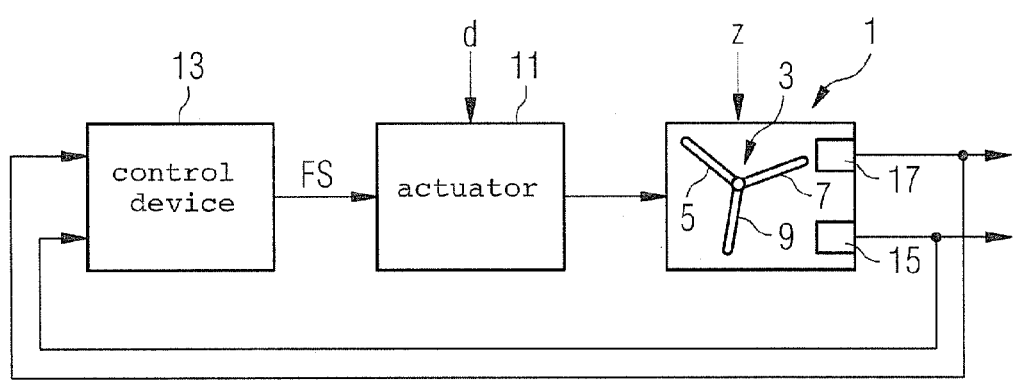
FIG. 1 shows, in the form of a block diagram, a wind turbine with an inventive control device.
Figure 2:
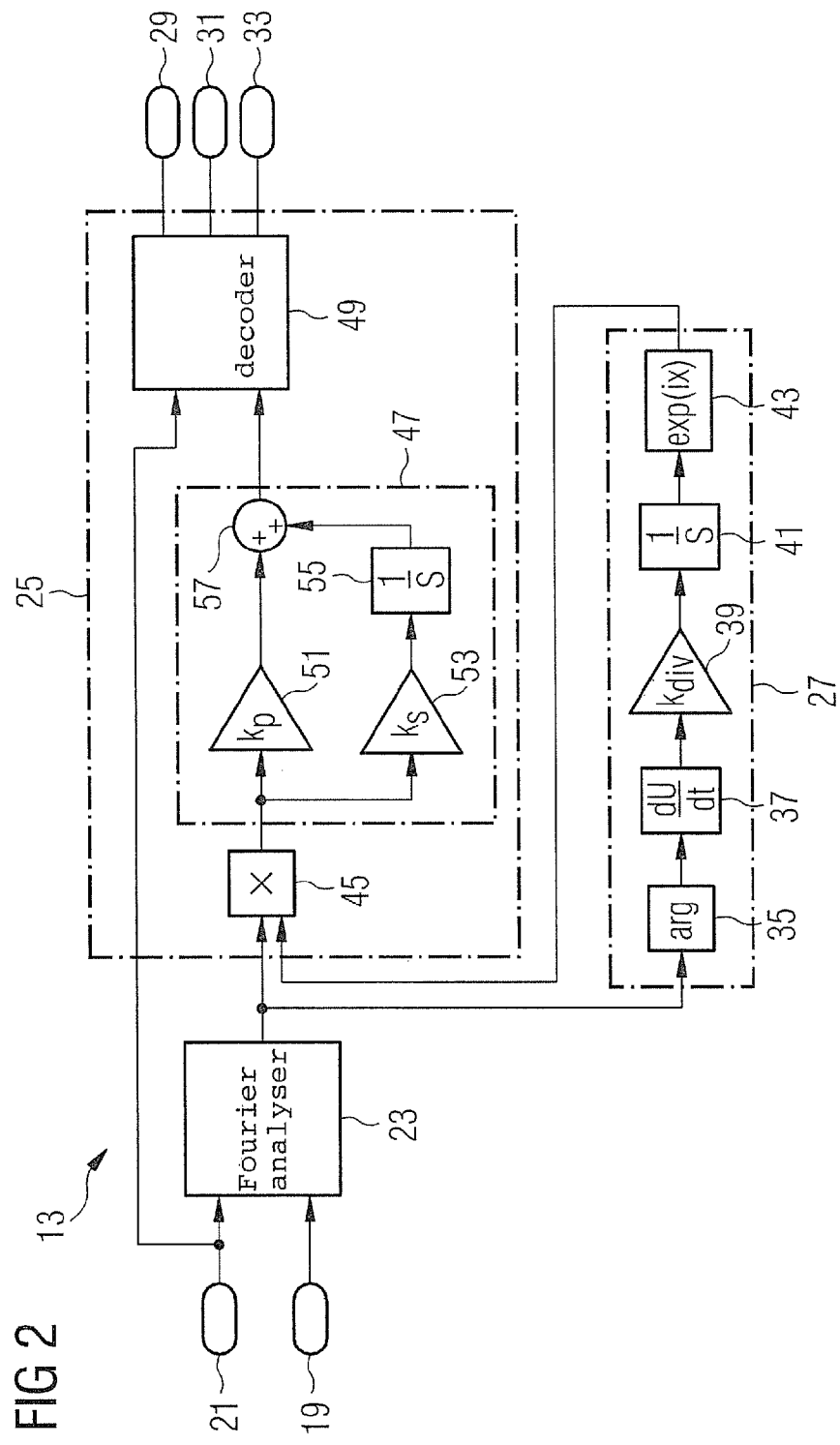
FIG. 2 shows the control device in a detailed block diagram.

FIG. 1 shows a wind turbine 1 which comprises a rotor 3 with three rotor blades 5, 7, 9. Each rotor blade is equipped with an active flap as an aerodynamic active element used in the present embodiment for active load reduction. In addition, or as an alternative, to the active flaps pitch control mechanisms could be present at the rotor blades 5, 7, 9 as aerodynamic active elements. The active flaps of the present embodiment are equipped with actuators that are schematically depicted as a block 11 in FIG. 1 and that are responsive to at least one control signal FS provided by the control device 13. Hence, the control device 13 is connected to the actuators 11 for outputting a control signal which defines the setting of the active flaps.

The rotor blades 5, 7, 9 are equipped with strain gauges which measure the load acting on the flap. These strain gauges are schematically indicated in FIG. 1 by block 15. However, different sensor means for measuring the load could be used, e.g. accelerometers. Moreover, the wind turbine 1 is equipped with an azimuth detector 17 for detecting the rotor's 3 azimuth in relation to a given direction, in the present embodiment in relation to the direction vertically upwards from the rotor hub. The strain gauges 15 and the azimuth detector 17 are connected to the control device 13 for delivering load data and azimuth data, respectively. This connection forms a feedback loop so that a feedback control is realised, i.e. the control signal for modifying the setting of the active flaps is determined such on the basis of the load data provided by the load gauges 15 and the azimuth data provided by the azimuth detector 17 as to minimise the loads measured by the load gauges 15.

The control device 13 will now be described in more detail with respect to FIG. 2. The control device comprises a load data input 19 receiving the load data from the load gauges 15 and a rotor azimuth input 21 for receiving the rotor azimuth data from the azimuth detector 17. It further comprises a Fourier analyser 23, a control signal calculator 25, a correction factor calculator 27 and, in the present embodiment, three control signal outputs 29, 21, 33 for outputting three control signals to the actuators 11.

The Fourier analyser 23 analyses the load data with respect to the azimuth data so as to continuously derive the Fourier spectra coefficients of the loads acting on the flaps of the rotor blades 5, 7, 9. The output of the Fourier analyser is a complex load vector, i.e. a vector L with three complex vector components L1 L2 L3, where each vector component represents the load measured by the strain gauge of a single rotor blade. It is clear to those skilled in the art that the number of vector components may be more or less than three if the rotor comprises more or less than three rotor blades. In other words, the number of complex vector components correlates with the number of rotor blades. If the complex vector components are represented in polar representation, each vector component is given by an amplitude and an angle of the respective vector component in the complex plane with respect to the complex plane's real axis. This angle is called the argument of the complex number. Due to delays in the strain gauges 15 and/or the azimuth detector 17 and/or the actuator 11 an artificial time dependency in the arguments of the complex vector components L1, L2, L3 may be present which will be corrected for in the inventive control device.

The correction factor calculator 27 is connected to the Fourier analyser 23 to receive the load vector L. It calculates and outputs a phase correction factor on the basis of the received load vector. The calculated phase correction factor shall counteract the artificial time dependency in the arguments of the load vector's vector components when calculating the control signals for the actuator 11. The control signal calculator is thus connected to the Fourier analyser 23 to receive the load vector and to the correction factor calculator 27 to receive the phase correction factor. In addition, the control signal calculator 25 is connected to the rotor azimuth input to receive the rotor azimuth signal that acts as a trigger for decoding the distribution of the individual control signals to the rotor blades 5, 7, 9. The control signal calculator 25 is further connected to the three control signal outputs 29, 31, 33 for outputting the decoded control signals for modifying the settings of the active flaps so as to minimise the loads acting on the flaps.

The complex load vector components L1, L2, L3 are each represented by complex numbers $Z1=R1\exp(i\phi1)$, $Z2=R2\exp(i\phi2)$ and $Z3=R3\exp(i\phi3)$ where R stands for the amplitude and $\phi$ for the argument of the respective complex number. As already mentioned, the arguments $\phi1$, $\phi2$, $\phi3$ may include an artificial time dependency due to delays in the sensors or in the actuators. These artificial time dependencies are taken into account by the phase correction factor calculated in the phase correction calculator 27.

The phase correction calculator 27 comprises an argument extraction unit 35 for extracting the arguments $\phi1$, $\phi2$, $\phi3$ of the complex vector components L1, L2, L3, a differentiator 37 which is connected to the argument extraction unit 35 for receiving the extracted arguments and which is designed to calculate the time derivatives of the arguments, an amplifier 39 which is connected to the differentiator for receiving the differentiated arguments and which is designed to amplify the differentiated arguments and to output amplified differentiated arguments, an integrator 41 which is connected to the amplifier 39 for receiving the amplified differentiated arguments and which is designed to integrate the amplified differentiated arguments over a given sample period and to output an integration value for each amplified differentiated argument and a complex correction factor building unit 43 which forms a complex number with an amplitude of 1 and the integration result multiplied by the imaginary unit i as an argument for each integration result. Therefore, the complex phase correction factor is represented by a matrix of the form $$\begin{pmatrix} \exp(i\alpha1) & 0 & 0 \\ 0 & \exp(i\alpha2) & 0 \\ 0 & 0 & \exp(i\alpha3) \end{pmatrix}$$

where $\alpha1$, $\alpha2$, $\alpha3$ represent the integration results. By differentiating the arguments $\phi1$, $\phi2$, $\phi3$ of the complex load vector components with respect to time non-time dependent contributions to the arguments drop out of the further processing. Those non-time dependent contributions would represent the real phases of the loads with respect to the rotor's azimuth and shall therefore not be corrected. Then, by again integrating the differentiated arguments over, e.g. a sample period, the effect of the artificial time dependency within the sample period is calculated and used to form the phase correction factor for correcting the load vector L over this sample period.

The control signal calculator 25 comprises a multiplier which is connected to the Fourier analyser 23 to receive the load vector L and to the correction factor calculator 27 to receive the complex correction factor. A PI-controller 47 is connected to the multiplier 45 to receive the multiplication result and to calculate the control signals for suitably modifying the settings of the flaps of the rotor blades 5, 7, 9 so as to minimise the loads acting on the flaps. The PI-controller comprises in parallel a proportional controller with an amplifier 51 and an integral controller with an amplifier 53 and an integrator 55. The outputs of the proportional controller and the integral controller are combined by an adder 57 to form the output of the PI-controller. This output is received by a decoder 49 which is also connected to the azimuth data input 21 to receive the azimuth data provided by the azimuth detector 17. Based on the azimuth data the decoder distributes the control signals provided by the PI-controller over the control signal outputs 29, 31, 33 from where they are delivered to the actuators 11 of the blade's active flaps.

Although individual phase correction factors are calculated in the present embodiment for each complex load vector L1, L2, L3 component, it might be possible to calculate only a single complex phase correction factor which is common for all complex load vector components L1, L2, L3. However, whether individual phase correction factors are necessary or a common phase correction factor is sufficient depends on the delays present in the actuators and the sensors.

The phase correction factor reduces the circular movement of the complex load vector components in the complex plane and forces the load vector to have a direction towards zero.

The present invention provides a method in which traditional regulation methods and advanced learning algorithms are replaced with a regulation method that superimposes a predictive function onto a classical, deterministic regulation algorithm. The advantage of the invention is that it does not need to rely on "true" learning algorithms but retains the benefits of easily modelled, classical regulation while eliminating the regulation delay drawbacks of such classical regulations.

The invention claimed is:

1. A control method that controls load reduction for a wind turbine rotor with rotor blades comprising an aerodynamic active element responsive to a control signal for modifying a setting of the respective element, the method comprising:
   detecting the loads acting on the rotor blades in relation to the azimuth of the rotor;
   establishing control signals based on a PI-control system, each control signal is a complex number includes an amplitude defining the degree of modification of the respective setting and includes an angle defining the phase of the modification of the respective setting with respect to the rotor's azimuth,
   correcting the angle of the complex number by a phase correction factor; and
   providing the aerodynamic active elements with the respective control signal,
   wherein the input to the PI-control system is a complex load vector;
   wherein the number of complex vector components of the complex load vector corresponds to the number of rotor blades,
   wherein the amplitude of a vector component defines the magnitude of the load acting on the respective blade and the angle of the vector component defines the phase of the load with respect to the azimuth of the rotor, and
   wherein the load vector is multiplied with the phase correction factor prior to being input to the PI-control system.

2. The control method as claimed in claim 1, wherein the phase correction factor is at least one complex number with unity absolute value and an argument defining a phase correction.

3. The control method as claimed in claim 2, wherein the phase correction factor comprises a complex number with unity absolute value and an argument defining a phase correction for each vector component of the load vector.

4. The control method as claimed in claim 3, wherein the phase correction factor is a matrix to be multiplied with the load vector.

5. The control method as claimed in claim 4, wherein the phase correction factor is derived from arguments of the complex vector components of the load vector.

6. The control method as claimed in claim 5, wherein the phase correction factor is derived by differentiation of the arguments of the complex vector components with respect to time, subsequent integration of the arguments of the complex vector components and forming complex numbers with unity absolute value and the results of the integration multiplied by the imaginary unit as argument.

7. The control method as claimed in claim 3, wherein the phase correction factor is derived from arguments of the complex vector components of the load vector.

8. The control method as claimed in claim 2, wherein the phase correction factor is derived from arguments of the complex vector components of the load vector.

9. The control method as claimed in claim 1, wherein the phase correction factor is derived from arguments of the complex vector components of the load vector.

10. A control device that controls load reduction for a wind turbine rotor with rotor blades comprising an aerodynamic active element responsive to a control signal for modifying a setting of the respective element, comprising:
    a load data input that receives load data representing the load acting on a rotor blade;
    a rotor azimuth input that receives rotor azimuth data representing the rotor azimuth;
    an oscillation detecting unit that connects to load data input in order to received the load data and that connects to the rotor azimuth input in order to received the rotor azimuth data, the oscillating detecting unit detects frequency components of the load acting on a rotor blade from the load data and the rotor azimuth data and outputs a complex load vector having a number of complex vector components of which corresponds to the number of rotor blades, the amplitude of a vector component defines the magnitude of the load acting on the respective blade and the angle of the vector component defines the phase of the load with respect to the rotor azimuth; and
    a correction factor calculator unit that connects to the oscillation detecting unit, the correction factor calculator unit receives the load vector calculates, a phase correction factor based the load vector, and outputs the calculated phase correction factor;
    a multiplier that connects to the oscillation detecting unit in order to receive the load vector and that connects to the correction factor calculator unit in order to receive the phase correction factor, the multiplier multiplies the load vector by the phase correction factor; and
    a PI-controller that connects to the multiplier in order to receive the multiplication result, the PI-controller outputs control signals for modifying the settings of the aerodynamic active elements of the rotor blades.

11. The control device as claimed in claim 10, wherein the correction factor calculator unit comprises:

an argument determination unit that connects to the oscillation detecting unit in order to receive the load vector, the argument determination unit determines the arguments of the load vector's complex vector components and outputs the determined arguments;

a differentiator that connects to the argument determination unit in order to receive the arguments, the differentiator determines the time derivative of the arguments and outputs the time derivative;

an integrator that connects to the differentiator in order to receive the time derivatives of the arguments, the integrator integrates the time derivatives of the arguments and outputs the integration values; and a complex factor building unit that connects to the integrator in order to receive the integration values, the complex factor building unit forms the phase correction factor by a multiplication of the integration values by the imaginary unit and a subsequent exponentiation.

\* \* \* \* \*